Patented June 24, 1941

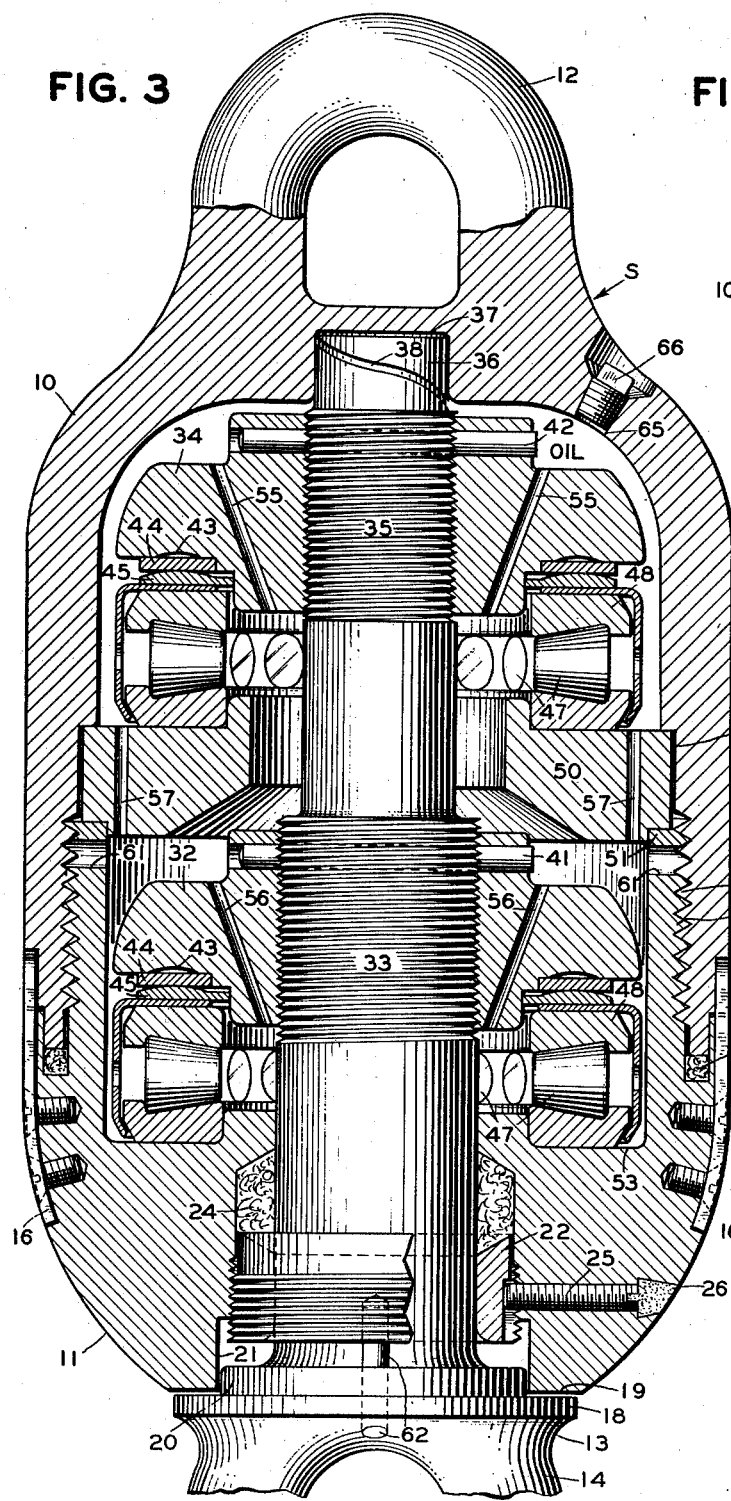

2,246,588

UNITED STATES PATENT OFFICE 2,246,588

BEARING STRUCTURE

Edwin R. Harrall, Tenafly, N. J., assignor to The Western Union Telegraph Company, New York, N. Y., a corporation of New York Application August 19, 1938, Serial No. 225,711

3 Claims. (Cl. 308—231)

My invention relates generally to bearings adapted for heavy duty work, and more particularly to an improved swivel construction.

Submarine cables which traverse the ocean or other body of water occasionally develop electrical faults, or sustain mechanical injury, at considerable distances from shore. When this occurs it is necessary to grapple for the cable and raise it to the deck of a cable ship out at sea, so that it may be repaired or the faulty section replaced by a new section. As the cable is thus raised by means of a grapnel rope and a grapnel, the torsional resistance characteristic of the spiral lay of the stiff steel cable armor wires causes the cable to twist and kink, and if substantial kinking occurs, long lengths of the cable may be rendered unfit for use and have to be cut out. Accordingly, it is necessary to relieve or prevent the torsional strains occurring in the cable by allowing the lower section of the grapnel rope to spin or twist during the raising of the cable, thus relieving strain in the cable without setting up an opposite strain in the grapnel rope. In an attempt to do this, various types of swivels heretofore known have been employed in the grapnel rope, but while such swivels have worked fairly well when not under load, thus acting intermittently to relieve torsional strain between periods of loading, no swivel heretofore known has been capable of turning freely under maximum stress, a condition where the relief of torsional strain is most needed, and no swivel heretofore known has worked satisfactorily where both slow and rapid rotation of the grapnel and the cable held by it are necessary under loads varying from a few hundred pounds to twenty tons or more.

An object of this invention is a heavy duty swivel for general use in which the foregoing disadvantages are obviated, and which is capable of revolving freely under any load up to its maximum capacity.

Another object is an improved swivel or other bearing device having suitable means for causing the total load on the device to be divided in predetermined ratios between two or more sets of bearings, and which is simple and rugged in construction, composed of few parts, and which accommodates itself automatically to any load up to its maximum capacity without adjustment or other attention.

The invention further resides in the features of combination, construction and arrangement hereafter disclosed and claimed.

For an understanding of the invention and for illustration of one of the various forms it may take, reference is had to the accompanying drawing, in which:

Fig. 1 shows a grapnel rope having a swivel inserted therein constructed in accordance with the invention;

Fig. 2 is a plan view of the lower end of the swivel of Fig. 1, with the grapnel rope removed for the sake of clarity; and Fig. 3 is a longitudinal section view of the swivel.

The swivel, generally indicated at S in Fig. 1, is shown as connected at its upper end to a grapnel rope or other line and at its lower end to another rope to which the cable grapnel or other load is secured. In the illustrative embodiment disclosed, the swivel comprises a two-part metal casing, the upper part 10 of the casing having an eye 12 integral therewith for receiving the rope g, and the lower part 11 having received therein a large swivel member or eye bolt 13 with an eye 14 for holding the rope r, the eye bolt being freely rotatable within the housing as hereinafter set forth.

Referring to Fig. 3, the two parts of the casing or housing are secured together by screw threads 10a and 10b in the respective parts, suitable packing material 15 being interposed between the adjoining ends of the housing parts to prevent escape of the oil or other lubricant with which the casing is filled, and also to prevent entrance of water when the swivel is working in the ocean at great depths and under severe hydraulic pressure. The two parts of the housing are firmly held in position, after the various parts of the swivel have been adjusted, by means of feather keys 16 which are secured by screws to the lower housing member 11 and are received within recesses in the upper housing member 10.

The eye bolt 13 has a circular shoulder portion 18 which faces a plane surface 19 of the casing member 11, the bolt also having a reduced circular portion 20 which is received within a circular opening 21 in the casing member. Surrounding the bolt is a closely fitting gland 22, screw-threaded into the member 11, the gland 22 and packing 24 providing a stuffing box to seal the opening in the member 11 through which the eye bolt passes. A set screw 25 which is screw-threaded in an aperture in member 11, engages a recessed portion in the gland 22 and locks the latter in its adjusted position. Lead packing 26 prevents the entrance of water through the aperture that receives the set screw 25.

Upper and lower bearing assemblages are provided within the casing, the lower assemblage comprising an annular steel collar 32 screw-threaded to a portion 33 of the eye bolt 13, the upper assemblage comprising a similar collar 34 screw-threaded to a reduced portion 35 of the eye bolt. The upper end 36 of the eye bolt is received within a recessed portion 37 of the upper housing member 10, which recessed portion forms a radial bearing for the upper end of the eye bolt, an oil groove 38 permitting proper lubrication of this bearing.

Locking pins 41 and 42 having a taper fit in openings through the collars 32 and 34 and the portions 33 and 35 of the eye bolt, lock the collars in their adjusted positions, the collars being adjustable longitudinally of the eye bolt by means of the screw-threaded portions 33 and 35 of the bolt.

Each of the collars 32 and 34 has an annular concave grooved portion 43 which bears on a flat spring steel ring 44, each groove 43 being adapted to load its associated ring on its inner and outer peripheries only. Each of the rings 44 bears on an annular steel collar 45, the upper surface of which is crowned to form a convex portion, so that it contacts the under surface of the ring 44 on a line midway between the inner and outer peripheries only.

Each of the collars 45 rests on one of the bearing assemblages, which may comprise any suitable type of bearing, for example, roller thrust bearings 47 which operate in a raceway 48. The upper bearing assemblage rests on an annular ring or collar 50 which, in turn, is supported by the upper end of the casing member 11. The outer periphery of collar 50 is received in a recessed portion 49 of the upper casing member 10, and the collar has a shoulder portion 51 which engages the inner wall of the casing member 11, thereby to keep the collar properly positioned. The lower bearing assemblage rests in and is positioned by an annular recessed portion 53 in the lower casing member 11.

Oil ducts 55 and 56 in the members 32 and 34, and ducts 57 in the member 50, facilitate circulation of the oil through the bearings 47 to properly lubricate the same and to prevent any air pockets when filling the housing with oil. The eye bolt 13 freely swivels in the casing S to prevent kinking of the cable and to relieve torsional strains occurring in the grapnel rope during the raising of the cable or other object attached to the rope or secured to the swivel, and the swivel is adapted for both slow and rapid rotation of the grapnel rope and the cable or other object supported thereby under any load from the minimum load up to the maximum capacity of the swivel. Recessed portions 58 in the lower casing member 11, Figs. 1 and 2, are provided to facilitate turning of the portion 11 when screwing or unscrewing the same relative to the upper portion 10 of the casing.

When assembling the swivel, the eye bolt is inserted in the lower casing member 11, after which the lower bearing assemblage is placed over the eye bolt and into its seat 53. The collar 45 and spring ring 44 are then inserted in position, and the collar member 32 screwed on the portion 33 of the eye bolt, until all members of the assemblage are in close contact, but without the application of any additional load. This adjustment and proper positioning of the collar is secured against alteration or movement by means of the pin 41 which is passed through one of the circular openings 61 in the member 11 and driven tightly into the apertured portion in collar 32 and through the eye bolt into the locked position shown in Fig. 3. The member 50 is then placed over the end of the eye bolt and properly centered on the lower housing 11 by means of shoulder 51, after which the upper bearing, the collar 45 and the ring 44 are put in place, the upper collar member 34 being properly adjusted about the threaded portion 35 of the eye bolt, and the locking pin 42 driven in place as before. The two portions of the casing 10 and 11 with the accompanying packing 15 in place, are then screwed together and locked in position by means of the feather keys 16. The gland 22 is adjusted to the proper position to compress the packing 24 about the eye bolt by means of pins inserted in holes 62, thus rotating the gland by turning eye bolt 13, until the packing is sufficiently compressed, and the set screw 25 inserted. The casing is then filled with a lubricant, such as oil, through the inlet 65, after which the plug 66 is screwed tightly into the inlet.

By means of the foregoing construction, any slight inequality between the fit of the two collars resting upon the two bearings which, in turn, rest upon the two supporting shoulders 50 and 53, is equalized by the spring rings deflecting in proportion to the load upon them until, in the illustrative embodiment disclosed, the loads on the bearings are approximately equal. If the rings are so designed that they deflect appreciably at loads of approximately 40% of the total load on the swivel, any slight deflection brings both rings into play and the two will divide the total load in some ratio between 60%–40% and 50%–50%. If the maximum total load on the swivel is not permitted to exceed 90% of the sum of the safe loads of the two bearings of equal capacity, all of the advantages of the invention can be achieved, and this fact has been verified by actual use on cable ships and has resulted in such experience as to indicate an almost unlimited life for the bearings so long as they are kept properly lubricated.

While the bearing structure has been described in connection with swivels for ocean cable maintenance, it is equally well adapted for general use, and particularly for marine and hoisting work. Also, it will be understood that by varying the shape, size and material, and thus the permissible deflection of, the spring members, any predetermined ratio of the total load can be applied to any bearing or number of bearings of any group, and thus bearings of different sizes and capacities may be employed without exceeding the operating capacity of any of them.

The specific arrangement and configuration of the various parts are illustrative only, and various other modifications and forms will suggest themselves to those versed in the art without departing from the invention, and the invention therefore is not restricted except as indicated by the appended claims.

I claim:

1. A bearing structure comprising a casing, a plurality of bearings within the casing for collectively carrying a load and means for distributing the load to the bearings, said means comprising groups of members for loading the bearings, each of said groups of members being adjacent to one of the bearings and each group including a plurality of members and a flat ring-shaped spring member disposed between said plurality of members and having outer and inner peripheral portions, one of said plurality of members having a surface of such configuration adjacent to one side of the member as to bear on its inner and outer peripheral portions without bearing on said member intermediate said inner and outer peripheral portions, and another of said plurality of members having a surface of such configuration adjacent to the opposite side of the spring member as to bear on the member at a place intermediate its inner and outer peripheral portions but not bearing on said inner and outer portions, said surfaces of the members coacting to flex the spring members of said groups to an extent such that the total load exerted on the bearings is distributed in predetermined ratios to the respective bearings.

2. A bearing structure comprising a casing, a plurality of bearings within the casing for collectively carrying a load, and means for substantially equalizing the load on the bearings, said equalizing means comprising groups of members for loading the bearings, each of said groups of members being adjacent to one of the bearings and each group including a plurality of members and a relatively flat ring-shaped spring member disposed between said plurality of members, one of said plurality of members having a surface of such configuration adjacent to one side of the spring member as to bear on spaced inner and outer peripheral zones thereof over substantially the entire area of said zones, and another of said plurality of members having a surface of such configuration adjacent to the opposite side of the spring member as to bear on the member in a zone intermediate said spaced peripheral zones but not bearing on said inner and outer peripheral zones, said surfaces of the members coacting to flex the spring members of said groups to an extent such that the total load exerted on the bearings is substantially equalized between the bearings.

3. A bearing structure comprising a casing, a plurality of bearings within the casing for collectively carrying a load, and means for substantially equalizing the load on the bearings, said equalizing means comprising groups of members for loading the bearings, each of said groups of members contacting one of the bearings and each group including two collar members and a flat spring ring-shaped member disposed between said collar members, one of said collar members having a concave surface contacting one side of said spring member over substantially the entire area of a circular zone thereof, and another of said collar members having a convex surface contacting the opposite side of the spring member over substantially the entire area of a circular zone thereof, said concave and convex surfaces coacting to flex the spring members of said groups to an extent such that the total load exerted on the bearings is substantially equalized between the bearings.

EDWIN R. HARRALL.